Aug. 22, 1933.   E. J. HIRVONEN   1,923,204
INDEXING DEVICE
Filed July 3, 1929   4 Sheets-Sheet 2

Inventor
Eric J. Hirvonen
By Attorneys

Aug. 22, 1933.                 E. J. HIRVONEN                   1,923,204
                                INDEXING DEVICE
                             Filed July 3, 1929           4 Sheets-Sheet 3
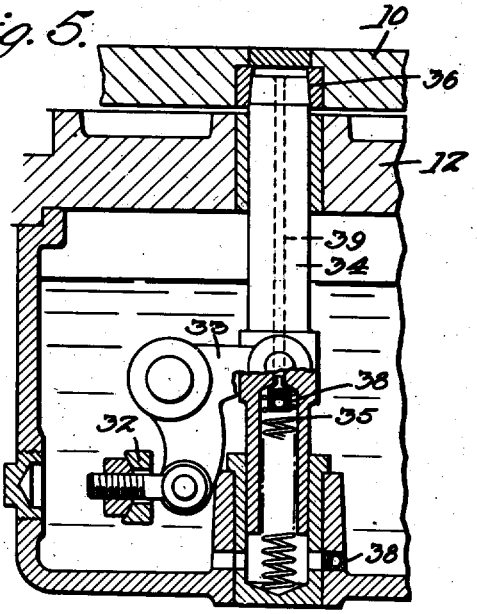
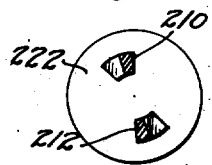
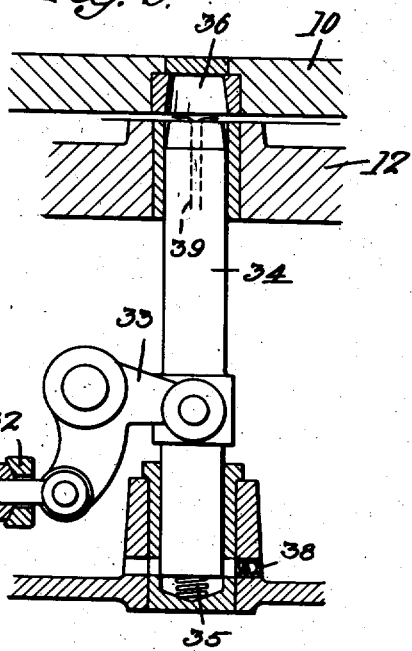
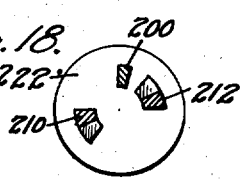
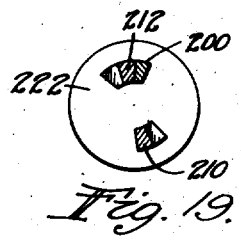
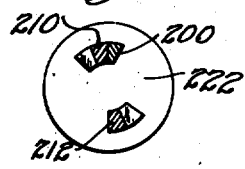
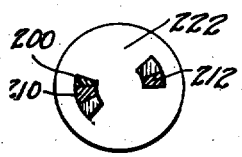

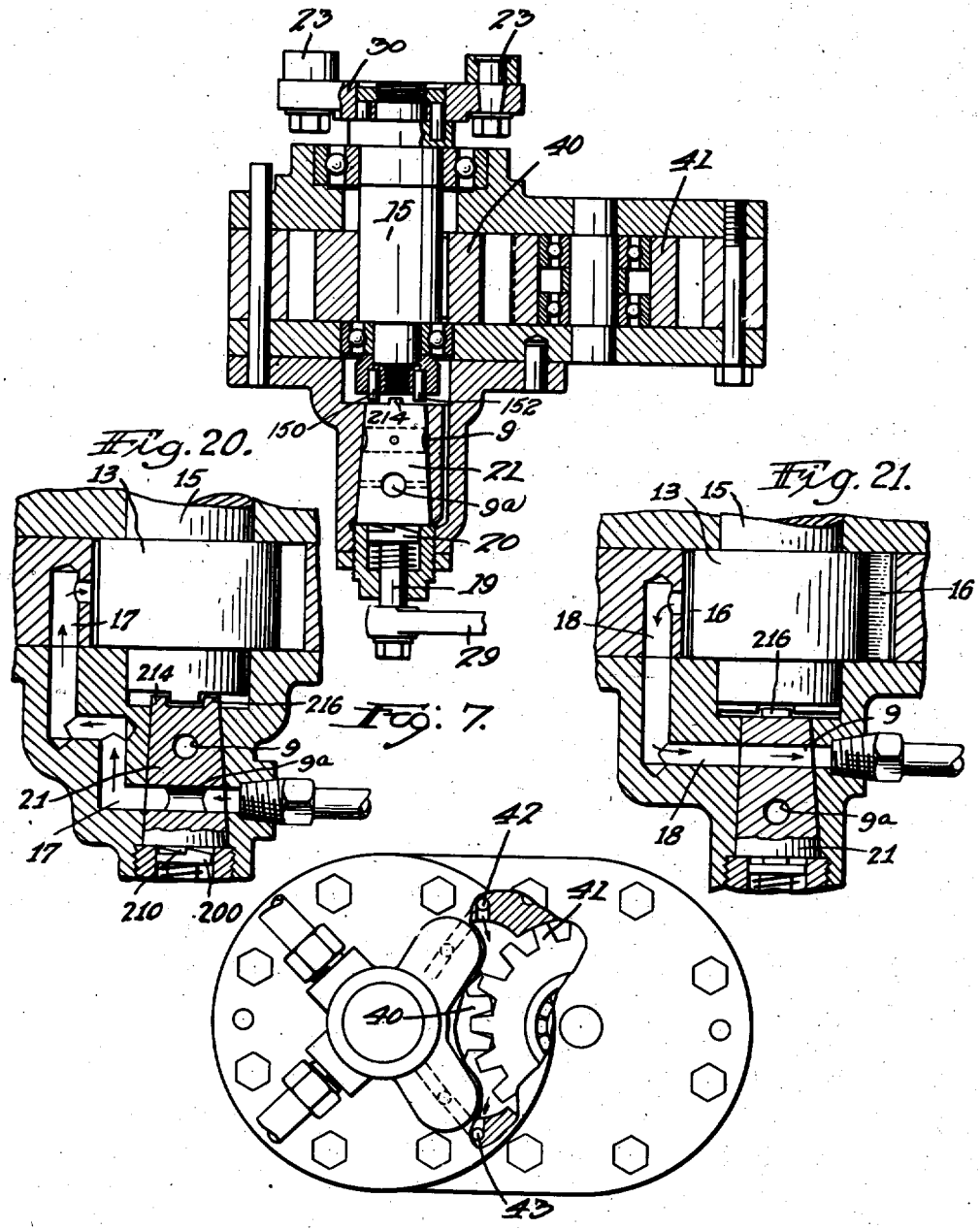

Patented Aug. 22, 1933

1,923,204

UNITED STATES PATENT OFFICE 1,923,204

INDEXING DEVICE

Eric J. Hirvonen, Worcester, Mass., assignor to Leland-Gifford Company, a Corporation of Massachusetts Application July 3, 1929. Serial No. 375,778

8 Claims. (Cl. 90—56)

This invention relates to an indexing device suitable for use with an upright drill, grinding machine or any kind of a machine in which the work is moved by a step-by-step motion on a wheel which supports it and past a tool or station where it is to be operated upon.

The principal objects of the invention are to provide means whereby a shaft connected with the motor is arranged to operate the indexing mechanism twice during each revolution and comes to a stop after each half revolution so as to reduce the extent of motion necessary for that purpose; to provide means whereby the indexing speed can be changed by changing a set of gears and to provide an improved means for locking the indexing wheel and unlocking it.

Other objects and advantages of the invention will appear hereinafter.

Reference is to be had to the accompanying drawings in which

Fig. 5 is a sectional view on the line 5—5 of Fig. 4, showing the means for locking the indexing wheel, Fig. 6 is a similar view showing it in unlocked condition;

Fig. 7 is a view similar to Fig. 1 showing another form of the invention, and

Fig. 8 is a plan of the same partly in section.

Fig. 9 is a section taken along line 9—9 of Fig. 1 and illustrating the construction of the valve-operating teeth at the lower end of the motor shaft.

Fig. 10 is a section taken along line 10—10 of Fig. 1 and illustrating the position of the teeth on the valve and motor shaft when the motor is stationary.

Fig. 11 is similar to Fig. 10 except that the valve is in open position.

Fig. 12 is similar to Fig. 11 except that the motor shaft has rotated into position to engage the valve teeth and rotate the valve toward closed position.

Fig. 13 is similar to Fig. 10 but with the motor shaft and valve in a 180° displaced position.

Fig. 14 is a section taken along line 14—14 of Fig. 1 but illustrating only the teeth on the bottom of the valve.

Fig. 15 is a section taken along line 15—15 of Fig. 1 but illustrating only the valve-operating tooth on the ratchet.

Fig. 16 is a section taken along line 14—14 of Fig. 1 and illustrating the rotative portions of the valve and ratchet teeth in the closed position of the valve.

Fig. 17 is a view similar to Fig. 16 but with the valve and ratchet advanced 90° from the position of Fig. 16 and with the valve open.

Fig. 18 is a view similar to Fig. 17 but with the ratchet returned to the position shown in Fig. 16.

Figure 2:
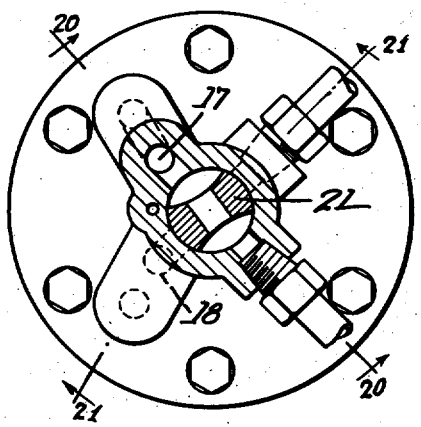
Fig. 2 is a horizontal sectional view on the line 2—2 of Fig. 1, looking in the direction of the arrows, showing the valve.

Fig. 19 is a view similar to Fig. 16 but with the valve in a closed position wherein it has been advanced 90° from its position shown in Fig. 18 by the rotation of the motor, and Figs. 20 and 21 are sectional views on the lines 20—20 and 21—21 respectively of Fig. 2.

The invention has to do with indexing devices which are employed in the usual way and are capable of general use for indexing purposes. I have shown the machine as involving a horizontal indexing wheel 10 mounted on a concentric shaft 11 which has suitable bearings mounted in a stationary frame or table 12. It will be understood that in accordance with the usual practice the table 10 is adapted to be turned through a part of a revolution at a time to bring the work, which may be clamped in a certain position thereon, into other positions for loading, unloading, drilling or grinding as the case may be.

The device is run by a small motor 13 having an eccentric bore 14 in its casing. In this is located a shaft 15 provided with opposite spring-pressed pistons 16 urged out by the springs into contact with the walls of the eccentric bore. Of course, upon the rotation of the shaft these pistons are forced back and forth radially but they always engage the bore.

Figure 3:
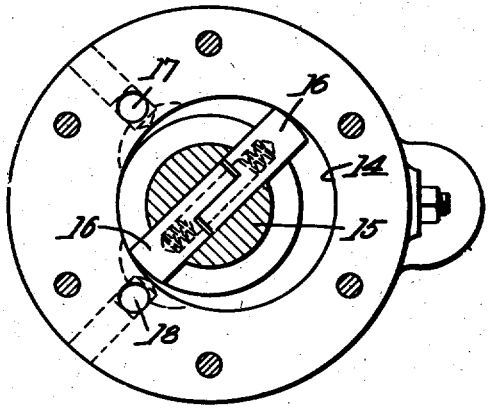
Fig. 3 is a horizontal sectional view on the line 3—3 of Fig. 1 showing the motor.

Operating liquid, as for example oil, is introduced through a valved inlet 17 and discharged through a valved outlet 18. When liquid is introduced it has a larger leverage on the piston on the side of the bore which is farthest out from the shaft, and the shaft will be rotated in a clockwise direction, Fig. 3.

It is an object of the present invention to have the motor, when started, rotate a predetermined part of a revolution, in this instance one half a revolution, and then stop automatically in readiness to rotate through a second half revolution, and so on. The mechanism for effecting this result includes a valve 21 of the plug type having upper and lower passages 9 and 9a respectively which, at the same time, can be placed in communication with the inlet port 17 and exhaust port 18 to admit the flow of oil through the motor to rotate it. The valve, when rotated into a position 90° displaced from the aforesaid position, closes the inlet and exhaust ports and so holds the motor from rotating.

Figure 1:
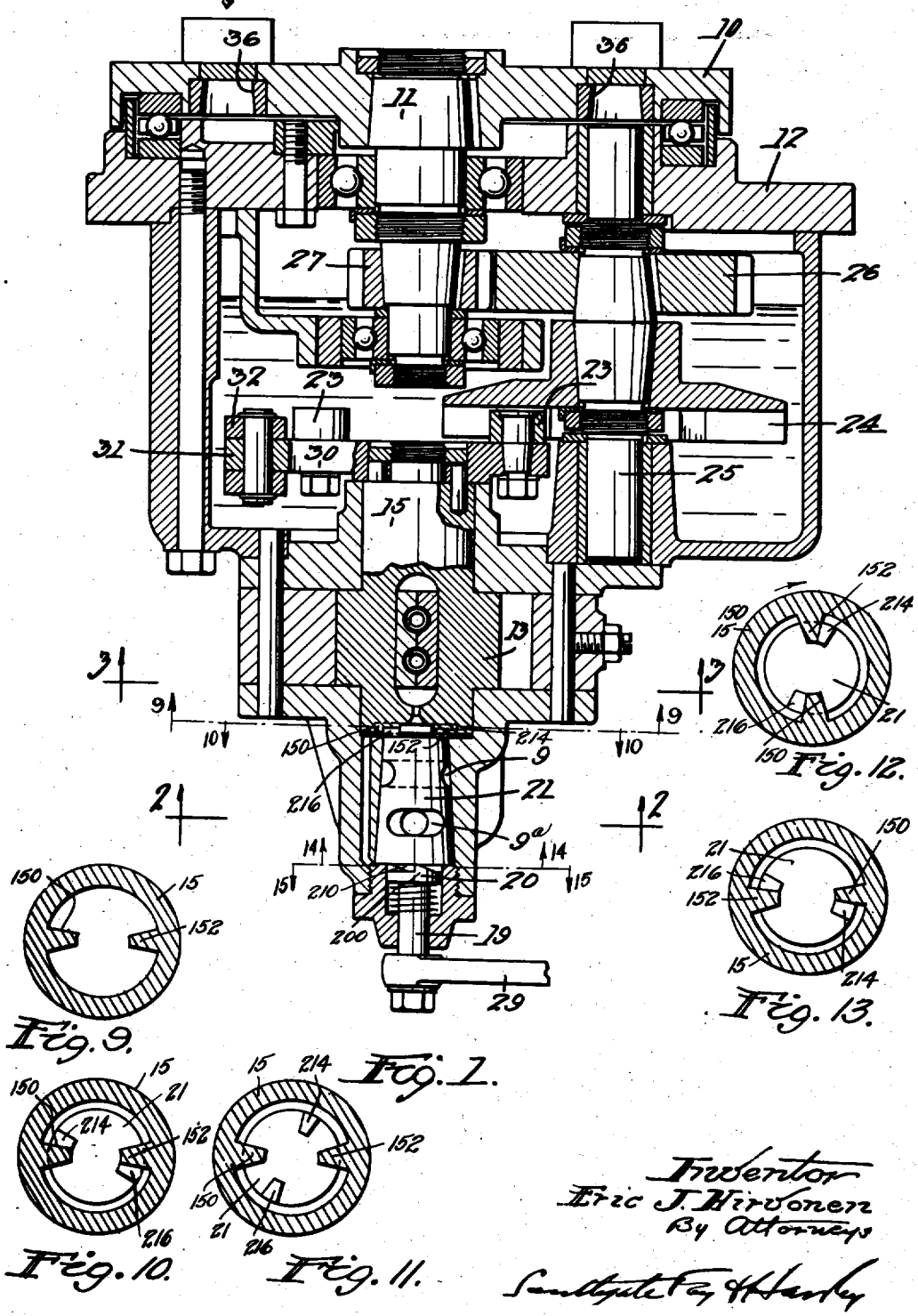
Fig. 1 is a diametrical sectional view of a complete indexing device constructed in accordance with this invention.

Said valve is adapted to be rotated by hand or by a movable part of the apparatus with which the present indexing apparatus is associated, for opening the valve, and also further in the same direction by the motor for closing the valve and thereby stopping the motor. For opening the valve by hand, or otherwise, the bottom of the valve is provided with two opposed ratchet teeth 210 and 212, Figs. 1 and 14, which are alternately engageable with a single tooth 200 (but one being necessary) of a spring pressed ratchet 20, Figs. 1 and 15. The ratchet is mounted on a shaft 19 and is operated by a handle or lever 29 fixed to said shaft. The ratchet is adapted to be advanced in engagement with the valve 21 sufficiently to open the valve to start the motor, whereupon the motor, by means about to be described, rotates the valve further and into a closed position 180° displaced from its initial position and into a position to be again rotated by the retracted ratchet when it is next advanced.

The mechanism for rotating the valve 21 by the motor comprises two opposed teeth 150 and 152 respectively, see Fig. 9, which project from the end of the motor shaft 15 and into the interdental spaces of two opposed teeth 214 and 216, see Figs. 1, 10, 11 and 12, which upstand from the upper end of the valve 21.

The operation is essentially as follows:

Assuming the valve 21 to be closed, the teeth 150 and 152 of the motor shaft will be beside the teeth 214 and 216 of the valve respectively, see Fig. 10, at the same time the tooth 210 on the bottom of the valve will be beside the tooth 200 of the ratchet 20, see Fig. 16. Rotating the ratchet 90° into the position of Fig. 17 similarly rotates and opens the valve and disposes its teeth 214 and 216 into the position of Fig. 11. Pressure liquid is now admitted to the motor, which rotates free from the valve for approximately 90° and then engages the valve teeth 214, 216 in the position shown in Fig. 12. The valve then rotates with the motor into the position shown in Fig. 13 at which time the valve has closed the ports 17 and 18 and the motor stops in a position that is displaced 180° from its starting position. During this rotation, the ratchet is intended to be retracted so that, when the motor stops, the tooth 212 of the valve is in position to be engaged by the tooth 200 of the ratchet for opening the valve on the next cycle of operation. It is not essential that the ratchet be returned to its initial position prior to the complete movement of the motor, as it can be returned at any subsequent time and, when again advanced, will open the valve and start the motor in operation. While the operation, for clearness, has been described on the assumption that the ratchet is retracted prior to each succeeding operation of the motor, this need not be the case. It is thought to be apparent that the ratchet can be rotated always in the same direction as its function is to open the valve so that the motor can rotate and then close the valve.

The valve is turned by the motor through pins 9 and projections 8 to open the exhaust. The valve is now turned half way around from its original position and the port 17 closed. The motor is turned another half rotation by operating the handle again in the same direction.

The motor shaft 15 is provided with a sector cam 30 which is provided with two rolls 23 diametrically opposite, the sector cam being located positively on the shaft 15. The two rolls are arranged to engage in alternation the grooves of a Geneva wheel 24.

Figure 4:
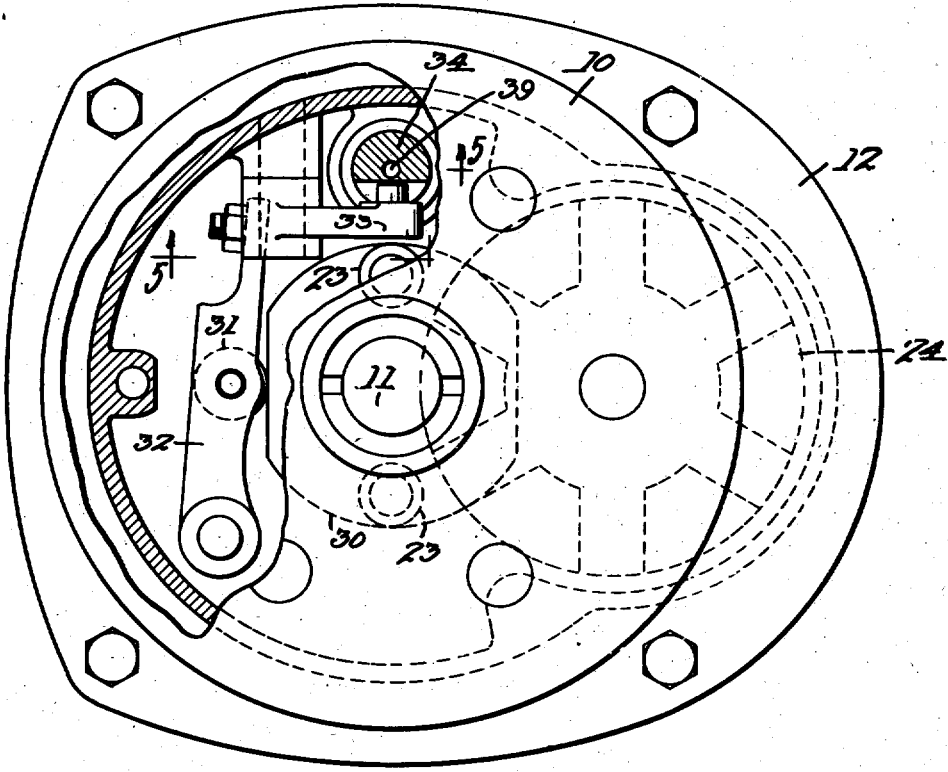
Fig. 4 is a plan of the indexing device with parts broken away to show interior construction.

As constructed this Geneva wheel has six radial grooves and consequently one roll 23 will rotate the Geneva wheel throughout an arc of 60° and then the rolls 23 come into the original position as indicated in Fig. 4. This, as stated, causes two operations per revolution of the shaft 15 instead of one. The Geneva wheel is mounted on a shaft 25 which is geared by replaceable gears 26 and 27 to the shaft 11. These gears 26 and 27 can be taken off and replaced very easily by an ordinary arrangement as will be seen. Thus the indexing speed can be changed merely by changing these gears without interfering with the rest of the mechanism.

The sector cam 30 has a circular part most of the way around and two flat sides. While the machine is operating the flat part of the cam moves outwardly a roll 31 on a lever 32. This actuates a bell crank 33 and holds a locking plug 34 down against its spring 35, thus keeping the plug out of whichever one of the several similar locking recesses 36 in the bottom of the wheel 10 is aligned with the plug.

When the machine stops the flat part of the cam comes to rest in a position to allow the bell crank to move back and the plug to be moved into the recess and lock the index wheel. This locking mechanism is located in a bath of oil and a couple of valves 38 cause the plunger, which constitutes a part of the locking plug, to pump oil up through a centrally located hole 39 to lubricate the part of the extreme top of the table 12. On the unlocking of the device by the withdrawing of the bolt inwardly the liquid fills the hole 39 at each stroke.

This constitutes a device in which a very simple form of motor can be used and can perform the whole function during a half revolution and will stop automatically when this cycle of operations is complete, leaving the parts in a position opposite to that in which they started ready for another operation. By providing for the complete operation with a half rotation of this motor, simplicity is increased and the size of the motor is reduced. By having the shaft 25 actuated alternately by a pair of rolls oppositely arranged on the shaft 15 the motor is enabled to perform this function in a half revolution instead of taking a whole one. These two features therefore cooperate to secure important results. As stated, the indexing speed can be changed by changing the gears without any tampering with the rest of the mechanism.

The locking means for the wheel is compact and consists of very few parts, this being due to the way in which it is designed to operate. It constitutes an improvement over the locking devices heretofore employed. This is important further for the reason that it provides for rapid indexing.

In the form shown in Figs. 7 and 8 all the parts are the same except the motor which is in rotary form. The motor merely comprises two gears 150

40 and 41, the gear 40 being connected with the valve 21 by the ratchet arrangement which has been described. The oil enters through the port 42 and when the motor has rotated half a revolution exhausted through the port 43. The operation is as usual with a gear motor but the indexing is more rapid and the action smoother.

With the construction of motor illustrated in Figs. 7 and 8 as well as in Figs. 1 through 4, it is to be noted that the valve 21, in closing, gradually throttles the ports 17 and 18 and consequently gradually slows down the speed of the motor and associated parts, thereby stopping the motor without shock. Since the valve also holds both the inlet and exhaust ports of the motor closed, the motor is locked against unpremeditated movement by the body of oil that is entrapped in the motor casing between the ports.

Although I have illustrated and described only one form of the invention I am aware of the fact that modifications can be made therein by any person skilled in the art without departing from the scope of the invention as expressed in the claims. Therefore, I do not wish to be limited in this respect but what I claim is:—

1. In an indexing device, the combination with a motor and a shaft therefor, of means for rotating the motor shaft intermittently always in the same direction half a revolution at a time and then stopping it, a pair of rolls located diametrically opposite each other and mounted on said shaft, a Geneva wheel located at the side of said shaft in position to be turned through a predetermined arc by each of said rolls as the motor turns throughout half a revolution, a shaft parallel with and at one side of said motor shaft on which the Geneva wheel is fixed, a third shaft in the axial line of said motor shaft, replaceable gears for connecting the last-named shaft with the Geneva wheel shaft, and an indexing wheel on the third shaft whereby the indexing speed can be changed by changing said gears.

2. In an indexing device, the combination of an indexing table, a hydraulic motor for rotating said table having an intermittent driving connection therewith, locking means for said table, and means operated by said motor when it is free from driving connection with said table for operating said locking means to lock and unlock said table, means including a valve for admitting fluid pressure to said motor for starting and stopping said motor, means for rotating said valve to start the motor, and means controlled by said motor when it is free from driving connection with said table to rotate said valve further in the same direction to stop the motor.

3. The combination of a driven shaft, a hydraulic motor for rotating said shaft having an intermittent driving connection therewith, a valve constituting means for stopping the motor, and means actuated by said motor only when it is free from driving engagement with said shaft for operating the valve.

4. The combination of a driven shaft, a hydraulic motor for rotating said shaft having an intermittent driving connection therewith, a valve for stopping said motor at the time it is free from driving connection with said shaft and means operated by said motor independently of said shafts for operating the valve.

5. An indexing device for machine tools comprising a supporting frame, an indexing shaft journalled in said frame, an index table carried by said shaft, a wheel shaft journalled in said frame under said table at one side of said indexing shaft, changeable gears carried by and connecting said shafts, a Geneva wheel carried by said wheel shaft, a hydraulic motor located below said shafts and having a shaft located under and in line with said indexing shaft, a disc carried by said motor shaft and having rollers which are movable into and out of driving engagement with said Geneva wheel, a valve for controlling the operation of said hydraulic motor located under and in line with said motor shaft, a connection between said valve and motor shaft by which said valve is closed and the motor is stopped after a predetermined extent of operation thereof, and a valve control member located under said valve and having a connection therewith arranged to open said valve and start the motor.

6. An indexing device as defined in claim 5 having a table locking pin disposed at one side of and parallel with said shafts and movable longitudinally in said frame into a selected one of a plurality of locking holes in said indexing table, operating mechanism for reciprocating said pin including a lever pivoted to said frame having an operative connection at one end therewith and having a part engageable with said disc, said disc having a cam surface engageable with said lever and said cam surface having a dwell portion located to effect the locking engagement of said locking pin and table when said disc rollers are free from driving engagement with said Geneva wheel.

7. An indexing device for machine tools comprising an enclosing casing having a cover, an indexing shaft journalled in said casing and cover, an indexing table fixed to said shaft externally of said casing and above said cover, a wheel shaft journalled in said casing and cover at one side of said indexing shaft, changeable gears connecting said shafts inside said casing, a Geneva wheel fixed to said wheel shaft under said gears, a motor shaft journalled in said casing under said indexing shaft, and a disc fixed to the upper end of said shaft and underlying said Geneva wheel and having rollers which are movable into and out of engagement with said wheel when said motor shaft is rotated.

8. An indexing device as defined in claim 7 including a locking pin slidable in said cover and casing having its upper end movable into any one of a plurality of locking holes in said indexing table, a spring for urging said pin longitudinally in a locking direction, and means including a lever for controlling the locking movement of said pin, said disc having a cam surface engageable with said lever for controlling the position thereof and having dwell portions so disposed with respect to the rollers of said disc as to effect the locking movement of said pin when said disc is free from driving connection with said wheel.

ERIC J. HIRVONEN.